US009879589B2

(12) United States Patent
Charnesky et al.

(10) Patent No.: US 9,879,589 B2
(45) Date of Patent: Jan. 30, 2018

(54) INITIALIZATION SEQUENCE FOR A VEHICLE GRILLE SHUTTER

(75) Inventors: Scott P. Charnesky, Birmingham, MI (US); David J. Verbrugge, Milford, MI (US); David A. Schoener, Grand Blanc, MI (US); William J. Raymor, Lake Orion, MI (US); John C. Remy, Shelby Township, MI (US); Brian A. MacFarlane, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 980 days.

(21) Appl. No.: 13/567,142

(22) Filed: Aug. 6, 2012

(65) Prior Publication Data
US 2014/0039765 A1 Feb. 6, 2014

(51) Int. Cl.
F01P 7/10 (2006.01)
B60K 11/08 (2006.01)
G06F 7/00 (2006.01)

(52) U.S. Cl.
CPC .............. F01P 7/10 (2013.01); B60K 11/085 (2013.01); F01P 2025/13 (2013.01); F01P 2025/30 (2013.01); F01P 2025/66 (2013.01); Y02T 10/88 (2013.01)

(58) Field of Classification Search
USPC ............................. 701/49; 454/75, 146, 278
See application file for complete search history.

(56) References Cited

U.S. PATENT DOCUMENTS

| 1,950,792 | A | * | 3/1934 | Green | 165/98 |
| 5,355,059 | A | * | 10/1994 | McMillan | 318/103 |
| 6,012,297 | A | * | 1/2000 | Ichishi et al. | 62/179 |
| 6,114,819 | A | * | 9/2000 | Porter et al. | 318/466 |
| 6,169,379 | B1 | * | 1/2001 | Zhang et al. | 318/280 |
| 2007/0028219 | A1 | * | 2/2007 | Miller et al. | 717/124 |
| 2010/0083917 | A1 | | 4/2010 | Saida et al. | |
| 2010/0243352 | A1 | * | 9/2010 | Watanabe et al. | 180/68.1 |
| 2011/0005851 | A1 | | 1/2011 | Doroghazi et al. | |
| 2011/0288717 | A1 | * | 11/2011 | Yu et al. | 701/29 |

(Continued)

FOREIGN PATENT DOCUMENTS

| CN | 102548784 A | 7/2012 |
| CN | 102555781 A | 7/2012 |
| DE | 102011116362 A1 | 4/2012 |

(Continued)

Primary Examiner — Anne M Antonucci
(74) Attorney, Agent, or Firm — Quinn IP Law

(57) ABSTRACT

A method of initializing operation of a shutter arranged relative to a grille opening in a vehicle having a power-plant includes detecting a start-up of the power-plant. The method also includes sensing a temperature of ambient air. The method also includes commanding the shutter to achieve a fully-opened position when the temperature of ambient air is above a predetermined value such that a flow of ambient air to the power-plant through the grille opening is substantially unrestricted. The method additionally includes commanding the shutter to achieve a fully-closed position when a temperature of the power-plant is maintained below a threshold value such that the flow of ambient air through the grille opening to the power-plant is substantially blocked. A vehicle using a controller configured to perform the above method is also provided.

19 Claims, 4 Drawing Sheets

(56) References Cited

U.S. PATENT DOCUMENTS

2012/0111652 A1    5/2012   Charnesky et al.
2013/0247862 A1    9/2013   Sakai

FOREIGN PATENT DOCUMENTS

| EP | 2233343 | A2 | 9/2010 |
|----|---------|----|--------|
| EP | 2327579 | A1 | 11/2010 |
| EP | 2407333 | A1 | 1/2012 |
| WO | 2012077508 | A1 | 6/2012 |

* cited by examiner

INITIALIZATION SEQUENCE FOR A VEHICLE GRILLE SHUTTER

TECHNICAL FIELD

The invention relates to a system and a method for initializing operation of a vehicle grille shutter.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

In motor vehicles, a shutter may be employed to control and direct a stream of air to various vehicle compartments and/or subsystems. Particularly, a shutter may be positioned at the front of the vehicle, in or proximate to the grille area, and employed to cool a vehicle's powertrain, as well as enhance comfort of vehicle passengers, while minimizing aerodynamic drag on the vehicle.

SUMMARY

A method of initializing operation of a shutter arranged relative to a grille opening in a vehicle having a power-plant includes detecting a start-up of the power-plant, such as when ignition is activated or a key is turned into an "on" position. The method also includes sensing a temperature of ambient air. The method also includes commanding the shutter to achieve a fully-opened position when the temperature of ambient air is above a predetermined value such that a flow of ambient air to the power-plant through the grille opening is substantially unrestricted. Hence, the method may ensure that the shutter is not commanded to change position when formation of ice is likely to impede free operation of the shutter. Furthermore, during the performance of the method the default position of the shutter is fully-open. The method additionally includes commanding the shutter to achieve a fully-closed position when a temperature of the power-plant is maintained below a threshold value such that the flow of ambient air through the grille opening to the power-plant is substantially blocked.

The act of commanding the shutter to achieve the fully-closed position may be accomplished when the vehicle is operating above a predetermined vehicle speed, i.e., when the vehicle's aerodynamic profile is sought to be enhanced, such as for improved fuel efficiency.

The method may also include detecting a temperature of the power-plant. In such a case, the act of commanding the shutter to achieve the fully-opened position may be accomplished when the temperature of the power-plant is at or above the threshold value, such as during a hot restart of the power-plant.

The method may additionally include setting a signal indicative of the shutter operation being initialized, i.e., suitable function of the shutter being detected and the shutter prepared or set up for operation. The shutter operation may be identified as having been initialized following the shutter having achieved full travel from the fully-opened position to the fully-closed position.

The vehicle may include a controller configured to regulate operation of the shutter. Accordingly, detecting the start-up of the power-plant, sensing the temperature of ambient air, commanding the shutter to achieve the fully-opened position, commanding the shutter to achieve the fully-closed position, detecting the temperature of the power-plant, and setting the signal may be accomplished via the controller.

The shutter may include an actuation mechanism configured to adjust the shutter such that the method may additionally include regulating the actuation mechanism by the controller to selectively open and close the grille opening.

The method may also include detecting via the actuation mechanism the achieved respective fully-opened and fully-closed positions of the shutter. Additionally, the method may include communicating the detected respective fully-opened and fully-closed positions to the controller and storing via the controller the detected respective fully-opened and fully-closed positions.

The power-plant may be an internal combustion engine cooled by a fluid circulated through a heat exchanger. In such a case, the method may additionally include regulating the actuation mechanism via the controller according to a temperature of the fluid. Therefore, the act of commanding the shutter to achieve the fully-closed position may be accomplished when the temperature of the fluid is maintained below the predetermined value. The temperature of the fluid may be detected by a sensor arranged on the vehicle.

The act of commanding the shutter to achieve one of the fully-opened and fully-closed positions may be accomplished when operation of the power-plant is terminated, such as when the engine has been turned off A vehicle having a power-plant and employing the shutter arranged relative to the grille opening and the controller to perform the above method is also disclosed.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
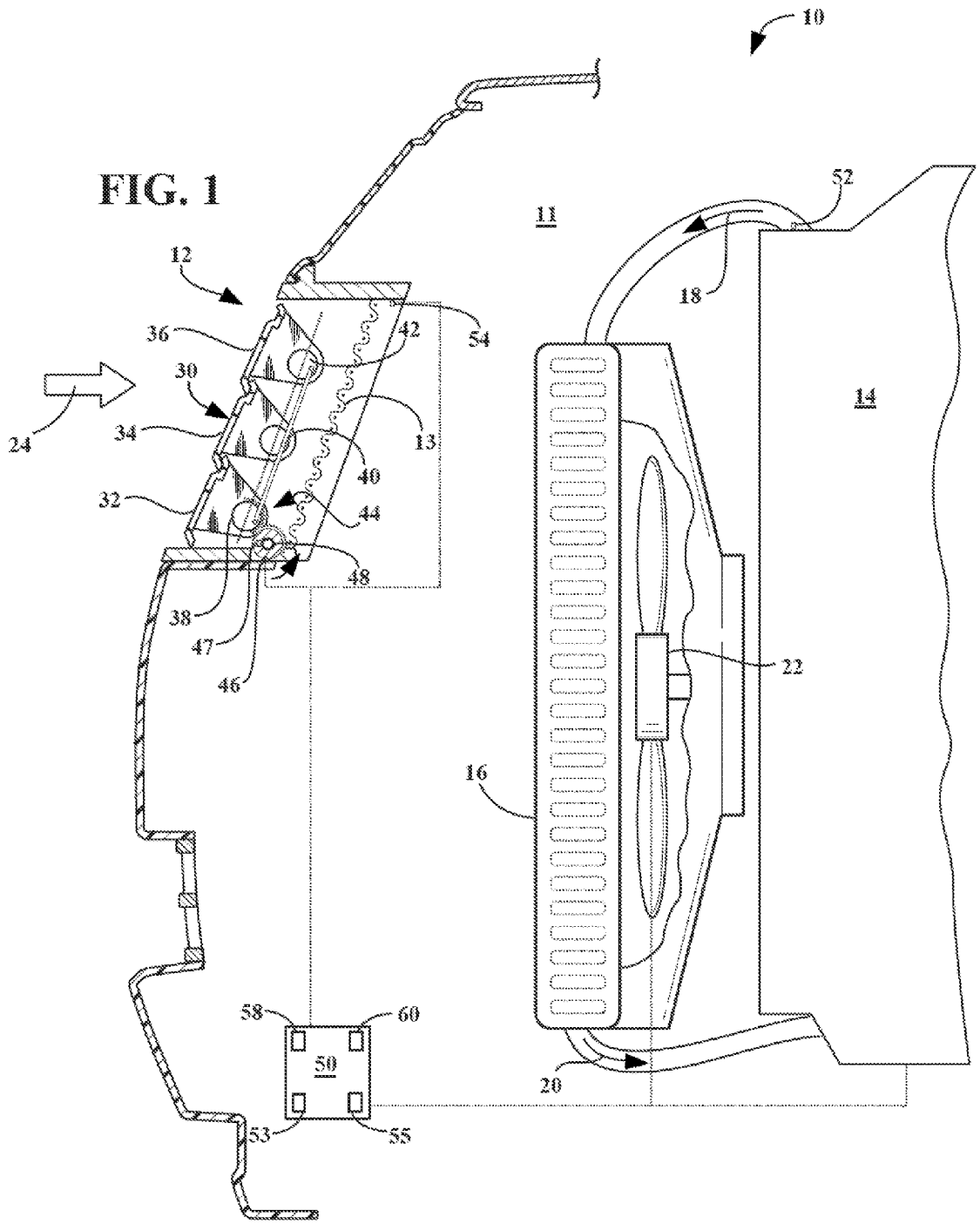
FIG. 1 is a schematic view of a system for acknowledging a presence of an individual relative to a vehicle having a shutter depicted in a fully closed state, wherein a partial side cross-sectional view of the vehicle is shown.
Figure 2:
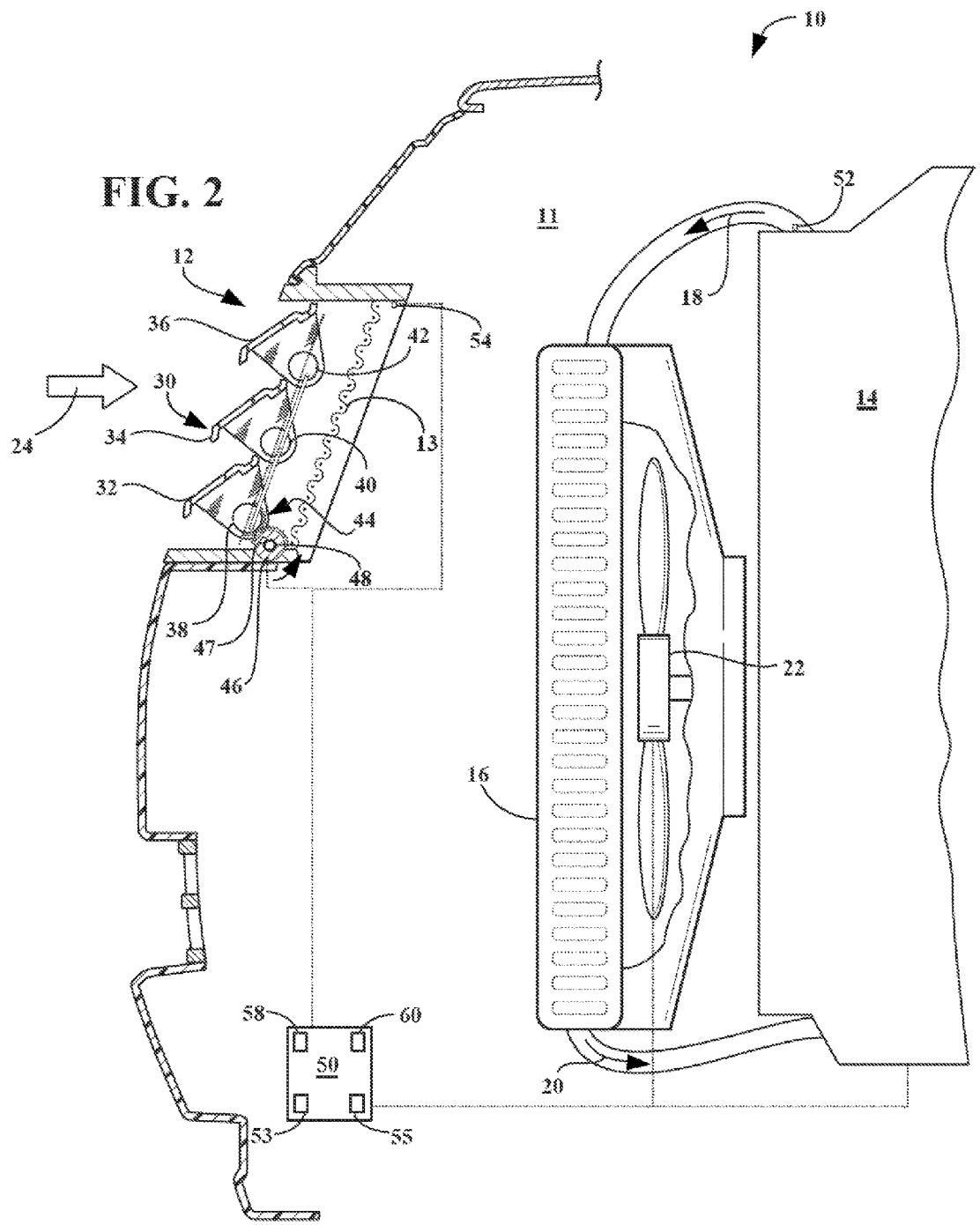
FIG. 2 is a schematic view of the system and a partial side cross-sectional view of the vehicle having the shutter shown in FIG. 1, with the shutter depicted in an intermediate state.
Figure 3:
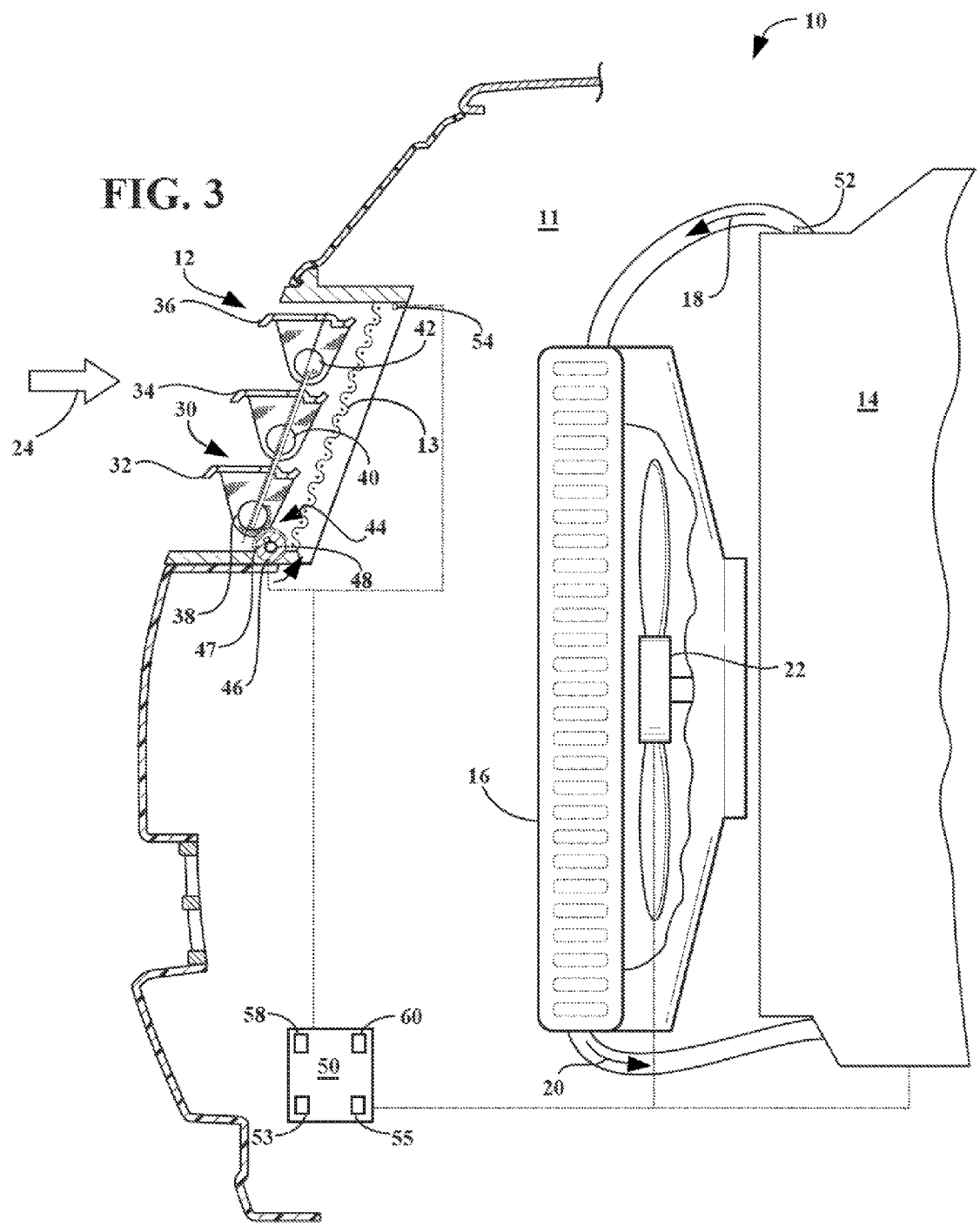
FIG. 3 is a schematic view of the system and a partial side cross-sectional view of the vehicle having the shutter shown in FIGS. 1 and 2, with the shutter depicted in a fully opened state.

Referring to the drawings, wherein like reference numbers refer to like components, FIGS. 1-3 show a partial side view of a vehicle 10. The vehicle 10 includes a compartment 11. The vehicle 10 is additionally shown to include a grille opening 12 that is covered by a grille mesh 13. The grille opening 12 is adapted for receiving ambient air and admitting such air to the compartment 11, while the grille mesh 13 is configured to restrict entry of debris from the ambient into the compartment. The compartment 11 is configured to house a powertrain. The powertrain includes a power-plant, which is specifically represented by an internal combustion (IC) engine 14, but may also take the form an electric motor, as in the case of a purely electric vehicle. Generally, internal combustion engines may be selectively turned on for powering the vehicle and turned off when the vehicle is stationary or to conserve fuel. The powertrain of the vehicle 10 may additionally include a transmission, and, if the vehicle is a hybrid type, one or more motor-generators, none of which is shown, but the existence of which can be appreciated by those skilled in the art. Efficiency of a vehicle powertrain is generally influenced by its design, as well as by the various loads the powertrain sees during its operation.

The vehicle 10 additionally includes an air-to-fluid heat exchanger 16, i.e., a radiator, for circulating a cooling fluid shown by arrows 18 and 20, such as water or a specially formulated coolant, through the engine 14 to remove heat from the engine. A high-temperature coolant entering the heat exchanger 16 is represented by the arrow 18, and a reduced-temperature coolant being returned to the engine is represented by the arrow 20. The heat exchanger 16 is positioned behind the grille opening 12 for protection of the heat exchanger from various road-, and air-borne debris. The heat exchanger 16 may also be positioned in any other location, such as behind a passenger compartment, if, for example, the vehicle has a rear or a mid-engine configuration, as understood by those skilled in the art.

As shown in FIGS. 1-3, a fan 22 is positioned in the vehicle 10, behind the heat exchanger 16, such that the heat exchanger 16 is positioned between the grille opening 12 and the fan. The fan 22 is capable of being selectively turned on and off based on the cooling needs of the engine 14. Depending on the road speed of the vehicle 10, the fan 22 is adapted to either generate or enhance a flow of ambient air or airflow 24 through the grille opening 12, and toward and through the heat exchanger 16. Thus generated or enhanced through the action of the fan 22, the airflow 24 is passed through the heat exchanger 16 to remove heat from the high-temperature coolant 18 before the reduced-temperature coolant 20 is returned to the engine 14.

FIGS. 1-3 also depict a rotatable or adjustable shutter 30. The shutter 30 is inset and secured in the grille opening 12 such that the shutter is the leading feature in the grille opening relative to the ambient airflow 24. Accordingly, the grille mesh 13 is arranged between the shutter 30 and the compartment 11. The shutter 30 is configured to regulate an amount of the airflow 24 entering or flowing into the vehicle through the grille opening 12. The shutter 30 also may be incorporated into, i.e., be integral with, the grille opening 12. The shutter 30 includes a plurality of louvers, herein shown as having three individual louver elements 32, 34, and 36, but the number of louvers may be either fewer or greater.

Each louver 32, 34, and 36 is configured to rotate about a respective pivot axis 38, 40, and 42 during operation of the shutter 30, thereby effectively controlling the size of the grille opening 12 and the amount of ambient air flowing into the vehicle. The shutter 30 is adapted to operate between and inclusive of a fully-closed position or state (as shown in FIG. 1), through an intermediate or partially-closed position (as shown in FIG. 2), and to a fully-opened position (as shown in FIG. 3). When the louver elements 32, 34, and 36 are in any of their open positions, the airflow 24 enters the vehicle 10 by penetrating the plane of shutter 30 before coming into contact with the heat exchanger 16.

The shutter 30 also includes an actuation mechanism 44 configured to adjust the shutter, and thereby select and lock a desired position of the shutter between and inclusive of fully-opened and fully-closed. The mechanism 44 is configured to cause the louvers 32-36 to rotate in tandem, i.e., substantially in unison, and permitting the shutter 30 to rotate into any of the available positions. The mechanism 44 may be adapted to select and lock either discrete intermediate position(s) of the louvers 32-36, or to infinitely vary position of the louvers between and inclusive of the fully-opened and fully-closed. The mechanism 44 acts to select the desired position for the shutter 30 and may include an electric motor 46 configured to apply motor torque to adjust the position of the shutter. The mechanism 44 may also include a sensor 47, shown as a strain gage positioned on the motor shaft 48 and configured to sense the motor torque. The sensor 47 may be configured to detect the achieved respective fully-opened and fully-closed positions of the shutter 30 as a function of the motor torque. For example, when torque of the motor 46 increases above a certain predetermined value, an electronic signal indicative of the louvers 32-36 having reached the end of their travel may be generated, which may take place either in the fully-closed or fully-opened position of the shutter 30.

The vehicle 10 also includes a controller 50, which may be an engine controller or a separate control unit, configured to operate the mechanism 44 via the motor 46 for selecting the desired position of the shutter 30. The controller 50 may also be configured to operate the fan 22, if the fan is electrically driven, and a thermostat (not shown) that is configured to regulate the circulation of coolant, as understood by those skilled in the art. The controller 50 is programmed to operate the mechanism 44 according to the load on the engine 14 when the engine 14 is turned on and generating heat. The sensor 47 may be configured to communicate the detected respective fully-opened and fully-closed positions to the controller 50, such that the controller may then store the detected respective fully-opened and fully-closed positions. When the shutter 30 is fully-closed, as depicted in FIG. 1, the louvers 32-36 provide blockage of the airflow 24 at the grille opening 12. When the vehicle 10 is in motion, but when engine cooling through the grille opening 12 is not required, a fully-closed shutter 30 provides optimized aerodynamics for the vehicle 10.

The shutter 30 may also be operated by the controller 50 to variably restrict access of the oncoming airflow 24 to the compartment 11, by rotating the louvers 32-36 to an intermediate position, as shown in FIG. 2, where the louvers are partially closed. An appropriate intermediate position of the louvers 32-36 may be selected by the controller 50 according to a programmed algorithm to thereby affect the desired cooling of the engine 14. The shutter 30 may also be placed in a fully-opened position, as shown in FIG. 3, wherein each louver 32-36 is rotated to a position parallel to the airflow 24 seeking to penetrate the shutter system plane. Thus, a fully-opened shutter 30 is configured to permit a generally unfettered passage of such a stream of air through the louver plane of the shutter 30.

The controller 50 is also configured to detect a start-up of the engine 14 as part of initializing operation of the shutter 30. Generally, operation of the shutter 30 is considered as initialized after suitable function of the shutter has been detected and verified, such that the shutter may be considered as prepared or set up for further operation. Identification that the shutter operation has been initialized may take place following the shutter 30 having achieved full travel from the fully-opened position to the fully-closed position. The start-up of the engine 14 is typically signaled by the fact that an ignition key is turned to an "on" position, or another button or switch is activated by a vehicle operator. As part of the initializing operation of the shutter 30, a temperature of the engine 14 is detected via a coolant temperature sensor 52 positioned in the flow of the high-temperature coolant 18. Furthermore, the shutter 30 is then commanded to achieve the fully-opened position when the temperature of the engine 14 is at or above a threshold value 53, such as during a hot engine restart.

The controller 50 is also configured to sense a temperature of ambient air via a temperature sensor 54 arranged on the vehicle 10. Additionally, the controller 50 is also configured to command the shutter 30 to achieve the fully-opened position when the temperature of ambient air is above a predetermined value 55, such as above the freezing point. Accordingly, in the case of the ambient temperature being below freezing, the controller 50 ensures that the shutter 30 is not commanded to change position when formation of ice is likely to impede free operation of the shutter, i.e., that the shutter is not iced up. The fully-opened position of the shutter 30 assures that the airflow 24 from the ambient to the engine 14 through the grille opening 12 is substantially unrestricted. In other words, the default mode at start-up of the engine 14 is the shutter 30 being fully-open.

The controller 50 is also configured to command the shutter 30 to achieve the fully-closed position via the mechanism 44 when the temperature of the engine 14 is maintained below the threshold value 53. The temperature of the engine 14 may again be detected via the coolant temperature sensor 52. The controller 50 may be configured to command the shutter 30 to achieve the fully-closed position when the vehicle 10 is operating above a predetermined vehicle speed, such as when the vehicle's aerodynamic profile is sought to be enhanced, for example to achieve improved fuel efficiency. Additionally, the controller 50 may be configured to command the shutter 30 to achieve either the fully-opened or the fully-closed position when operation of the engine 14 is terminated or keyed-off.

As such, the controller is configured to command the shutter 30 to achieve its fully-closed position in relation to the cooling needs of the engine 14, and may take place following any time interval after engine start-up. Once the shutter 30 achieves the fully-closed position, initialization sequence for operation of the shutter is considered to be complete, i.e., the shutter is considered to be set up for further operation. Furthermore, the controller 50 may also be configured to set a signal 58 indicative of the shutter operation being initialized once the shutter 30 is fully closed. In order to generate the signal 58, the controller 50 may reference the stored fully-opened and fully-closed positions of the shutter 30 that were previously communicated to the controller by the sensor 47.

The shutter 30 may become obstructed, for example by road debris. To cease the initialization sequence of the shutter 30 when the shutter is being obstructed, the controller 50 may control the motor 46 to reduce the motor torque when such torque exceeds a predetermined maximum torque value 60. The motor torque may be sensed by the sensor 47, as described above, and the sensed motor torque may then be communicated to the controller 50. The motor torque may also be detected by sensing a sharp increase in the electric current being drawn by the motor 46, which may then be communicated to the controller 50. Consequently, the predetermined maximum torque value 60 may be programmed into the controller 50 and then be used as a reference for comparison to the sensed motor torque during operation of the shutter 30.

As noted above, ambient temperatures near and below freezing may present considerations for the initialization sequence of the shutter 30. When the ambient temperature is below the predetermined value 55, i.e., near or below freezing, the louvers 32-36 and the mechanism 44 may freeze and become jammed. Therefore, in order to prevent failure of the shutter 30 and jamming thereof in some unwanted position, when the ambient temperature is below the predetermined value 55 the system 12 may be deactivated by sensing the motor torque via the sensor 47 and communicating the sensed torque to the controller 50.

Figure 4:
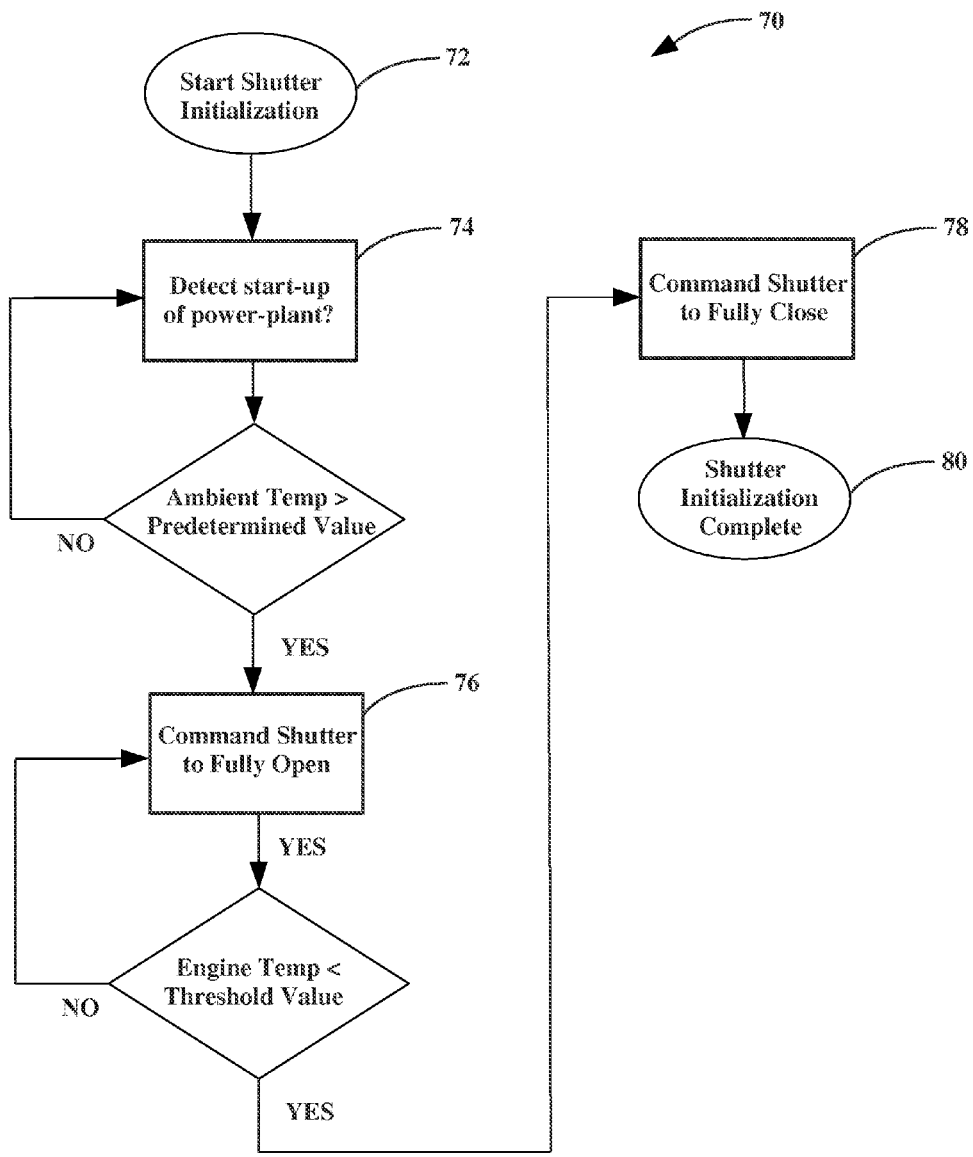
FIG. 4 is a flow chart illustrating a method of acknowledging a presence of an individual relative to the vehicle depicted in FIGS. 1-3.

FIG. 4 depicts a method 70 of initializing operation of the shutter 30, as described above with respect to FIGS. 1-3. The method commences in frame 72 and then proceeds to frame 74 where it includes detecting the start-up of the power-plant, such as the described IC engine 14. In frame 74, the controller 50 is responsible for sensing the temperature of ambient air to ensure that the shutter is not iced up. Following frame 74, the method advances to frame 76. In frame 76, the method includes commanding the shutter 30 to achieve the fully-opened position when the temperature of ambient air is above the predetermined value 55 such that the flow of ambient air to the engine 14 through the grille opening 12 is substantially unrestricted. Accordingly, the default mode of the shutter 30 during initialization of its operation is fully-open.

Following frame 76, the method proceeds to frame 78. In frame 78, the method includes commanding the shutter 30 to achieve the fully-closed position when the temperature of the engine 14 is maintained below the threshold value 53 such that the flow of ambient air through the grille opening 12 to the engine is substantially blocked. As such, when the engine 14 is sufficiently cooled, and, therefore, operation of the engine does not require the flow of ambient air through the grille opening 12, the shutter may be commanded by the controller 50 to be fully closed. The method may also include the shutter 30 to achieve either the fully-opened or the fully-closed position when operation of the engine 14 is terminated or keyed-off. The procedure is terminated in frame 80, where the initialization sequence is complete.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of initializing operation of a shutter arranged relative to a grille opening in a vehicle having a power-plant, the method comprising:
   detecting via a controller a start-up of the power-plant;
   sensing via the controller a temperature of ambient air upon the start-up of the power-plant;
   commanding the shutter, via the controller, to achieve a fully-opened position when the sensed temperature of ambient air upon the start-up of the power-plant is above a predetermined value such that a flow of ambient air to the power-plant through the grille opening is substantially unrestricted;
   sensing via the controller a temperature of the power-plant;

commanding the shutter, via the controller, to achieve a fully-closed position when the temperature of the power-plant is maintained below a threshold value such that the flow of ambient air through the grille opening to the power-plant is substantially blocked; and identifying via the controller that the shutter has achieved full travel following the shutter having achieved each of the fully-opened position and the fully-closed position in sequence;

wherein said identifying that the shutter has achieved full travel is indicative of the operation of the shutter having been initialized.

2. The method of claim 1, wherein said commanding the shutter to achieve the fully-closed position is accomplished when the vehicle is operating above a predetermined vehicle speed.

3. The method of claim 1, further comprising detecting a temperature of the power-plant, wherein said commanding the shutter to achieve the fully-opened position is accomplished when the temperature of the power-plant is at or above the threshold value.

4. The method of claim 3, further comprising setting a signal indicative of the shutter operation having been initialized following the shutter having achieved full travel from the fully-opened position to the fully-closed position.

5. The method of claim 4, wherein each of said detecting the temperature of the power-plant and setting the signal is accomplished via the controller.

6. The method of claim 5, wherein the shutter includes an actuation mechanism configured to adjust the shutter, the method further comprising regulating the actuation mechanism by the controller to selectively open and close the grille opening.

7. The method of claim 6, further comprising:
detecting via the actuation mechanism the achieved respective fully-opened and fully-closed positions of the shutter;
communicating the detected respective fully-opened and fully-closed positions to the controller; and
storing via the controller the detected respective fully-opened and fully-closed positions.

8. The method of claim 7, wherein the power-plant is an internal combustion engine cooled by a fluid circulated through a heat exchanger, the method further comprising regulating the actuation mechanism via the controller according to a temperature of the fluid.

9. The method of claim 8, wherein said commanding the shutter to achieve the fully-closed position is accomplished when the temperature of the fluid is maintained below the threshold value.

10. The method of claim 1, wherein said commanding the shutter to achieve one of the fully-opened and fully-closed positions is accomplished when operation of the power-plant is terminated.

11. A vehicle comprising:
a power-plant;
a grille opening;
an adjustable shutter arranged relative to the grille opening and configured to selectively open and close the grille opening; and
a controller configured to initialize operation of the shutter via:

detecting a start-up of the power-plant;
sensing a temperature of ambient air upon the start-up of the power-plant;
commanding the shutter to achieve a fully-opened position when the sensed temperature of ambient air upon the start-up of the power-plant is above a predetermined value such that a flow of ambient air to the power-plant through the grille opening is substantially unrestricted;
sensing the temperature of the power-plant;
commanding the shutter to achieve a fully-closed position when the temperature of the power-plant is maintained below a threshold value such that the flow of ambient air through the grille opening to the power-plant is substantially blocked; and
identifying that the shutter has achieved full travel following the shutter having achieved each of the fully-opened position and the fully-closed position in sequence;
wherein the identification that the shutter has achieved full travel is indicative of the operation of the shutter having been initialized.

12. The vehicle of claim 11, wherein the controller is configured to command the shutter to achieve the fully-closed position when the vehicle is operating above a predetermined vehicle speed.

13. The vehicle of claim 11, wherein the controller is additionally configured to detect a temperature of the power-plant and command the shutter to achieve the fully-opened position when the temperature of the power-plant is at or above the threshold value.

14. The vehicle of claim 13, wherein the controller is additionally configured to set a signal indicative of the shutter operation having been initialized following the shutter having achieved full travel from the fully-opened position to the fully-closed position.

15. The vehicle of claim 14, wherein the shutter includes an actuation mechanism configured to adjust the shutter, and wherein the actuation mechanism is regulated by the controller to selectively open and close the grille opening.

16. The vehicle of claim 15, wherein:
the actuation mechanism is configured to detect the achieved respective fully-opened and fully-closed positions of the shutter and communicate the detected respective fully-opened and fully-closed positions to the controller; and
the controller is additionally configured to store the detected respective fully-opened and fully-closed positions.

17. The vehicle of claim 15, wherein the power-plant is an internal combustion engine cooled by a fluid circulated through a heat exchanger, and the controller is configured to regulate the actuation mechanism according to a temperature of the fluid.

18. The vehicle of claim 17, further comprising a sensor configured to detect the temperature of the fluid, wherein the controller is configured to command the shutter to achieve the fully-closed position when the detected temperature of the fluid is maintained below the predetermined value.

19. The vehicle of claim 11, wherein the controller is configured to command the shutter to achieve one of the fully-opened and fully-closed positions when operation of the power-plant is terminated.

* * * * *